United States Patent [19]

Jabloner

[11] 4,097,460

[45] Jun. 27, 1978

[54] POLY(ARYLACETYLENES) AND THERMOSET RESINS THEREFROM

[75] Inventor: Harold Jabloner, Wilmington, Del.

[73] Assignee: Hercules Incorporated, Wilmington, Del.

[21] Appl. No.: 262,166

[22] Filed: Jun. 12, 1972

Related U.S. Application Data

[63] Continuation-in-part of Ser. No. 165,592, Jul. 23, 1971, abandoned.

[51] Int. Cl.² .................. C08G 65/00; C08G 67/00; C08F 38/00
[52] U.S. Cl. .................. 260/47 UA; 260/37 R; 260/42.47; 260/875; 526/90; 526/172; 526/285
[58] Field of Search ............ 260/94.1, 93.5 R, 88.2 C, 260/47 UA; 526/285, 172, 90

[56] References Cited

U.S. PATENT DOCUMENTS

| 3,066,119 | 11/1962 | Meriwether et al. | 260/94.1 |
|---|---|---|---|
| 3,519,611 | 7/1970 | Hay | 260/94.1 |
| 3,705,131 | 12/1972 | Korshak | 260/93.5 R |
| 3,748,305 | 7/1973 | White et al. | 260/47 UA |
| 3,749,700 | 7/1973 | Stephens et al. | 526/285 |
| 3,756,982 | 9/1973 | Korshak et al. | 260/47 UA |
| 3,816,374 | 6/1974 | White | 260/47 UA |
| 4,020,265 | 4/1977 | White | 260/47 UA |

*Primary Examiner*—Harold D. Anderson
*Attorney, Agent, or Firm*—John W. Whitson

[57] ABSTRACT

The invention relates to arylacetylene polymers and thermoset resins prepared therefrom. The preferred thermoset resins are prepared by copolymerizing a polyacetylenically unsaturated prepolymer with about 2 to 70% of a monomeric acetylenically unsaturated aromatic compound that has a melting point below about 185° C. and a boiling point above about 250° C. The polyacetylenically unsaturated prepolymer is a polymer of at least one polyacetylenically substituted aromatic compound such as a diethynylbenzene, which prepolymer has a number average molecular weight of about 900 to 12,000 and contains about 5 to 20% by weight of acetylenic groups. Typical monomeric acetylenic aromatic compounds that are copolymerized with the prepolymer are diphenylacetylene and diphenylbutadiyne.

10 Claims, No Drawings

POLY(ARYLACETYLENES) AND THERMOSET RESINS THEREFROM

This application is a continuation-in-part of copending application Ser. No. 165,592, filed July 23, 1971 now abandoned.

This invention relates to new acetylene polymers and thermoset resins and more particularly to such polymers and resins derived from acetylenically substituted aromatic compounds. The thermoset resins have exceptional thermal stability, and the invention also relates to the preparation of these resins.

High temperature resins presently available have various drawbacks which limit their use in many applications. A serious one frequently encountered is the evolution of volatiles during the curing cycle, which makes it imperative that the entire curing cycle be carried out under pressure. For example, polyimides when cured release volatile components which cause gas bubble or void formation in the cured resin unless considerable pressure is maintained during the curing operation in order to prevent these undesirable results. When phenolic resins are cured, water is released which also causes void formation unless the curing reaction is carried out under pressure. Another disadvantage of the previously known high temperature resistant resins is their inability to be molded into desired shapes by conventional methods due to their poor flow characteristics.

Now, in accordance with this invention, thermoset resins have been discovered which have excellent thermal properties and which can be molded or otherwise shaped without gas evolution, hence, after forming into the desired shape, they can be cured simply by heating, and this operation need not be carried out under pressure. The preferred thermoset resins of this invention comprise a copolymer of (1) a prepolymer of at least one polyacetylenically substituted aromatic compound, said prepolymer having a number average molecular weight of from about 900 to about 12,000 with (2) at least one acetylenically substituted aromatic monomeric compound having a melting point below about 185° C. and a boiling point above about 250° C., said copolymer being essentially free of aliphatic unsaturation and predominantly aromatic in structure. However, satisfactory thermoset resins also may be prepared directly from the aforementioned prepolymer using certain techniques, such as compression molding, especially with a small amount of volatile solvent present. These thermoset resins are further characterized by having a flexural strength of at least about 4000 p.s.i. and a flexural modulus of at least about 350,000 p.s.i., retaining at least about 60% of said flexural modulus up to a temperature of at least about 300° C. in an inert atmosphere, retaining at least about 50% of said flexural strength and modulus and at least about 80% of their weight when a 30 mil thick sheet is aged in air at 200° C. for 1000 hours and losing less than about 10% of their weight when heated, in powder form, to 500° C. at a rate of 5° per minute in an inert atmosphere.

The preferred thermoset resins of this invention are prepared by a two stage process. There is prepared, in the first stage, a polyacetylenically unsaturated prepolymer from a polyacetylenically substituted aromatic compound. In the second stage, the prepolymer in combination with at least one acetylenically substituted aromatic compound having a melting point below about 185° C. and a boiling point greater than about 250° C. is shaped and heated whereby resinification takes place. By this means it is possible to produce the thermoset resin in any desired shape since the blend of the prepolymer and the acetylenically substituted aromatic compound is readily formed into any desired shape and this molded, or otherwise formed, article can then be cured by heating and will retain its shape. When the thermoset resins are prepared directly from the polyacetylenically unsaturated prepolymers, a second stage reaction also, of course, is involved, namely, that of heating the prepolymer to effect curing.

PREPARATION OF THE PREPOLYMER

As already stated, the first stage in the preparation of the preferred thermoset resins of this invention is the formation of a prepolymer from at least one polyacetylenically substituted aromatic compound, which prepolymer is subsequently reacted in a second stage with an acetylenically substituted aromatic compound, which can be the same as that used in the preparation of the prepolymer, or different, provided that it has a melting point below about 185° C. and a boiling point above about 250° C.

The polyacetylenically substituted aromatic compound used to prepare these prepolymers can be any aromatic compound containing two or more acetylene groups, i.e., two carbons linked by a triple bond, attached to the same aromatic ring or to different aromatic rings in the compound, or mixtures of such compounds. The acetylenic groups can be internal, i.e., acetylene groups of the type aryl-C≡C-aryl, or they can be external, i.e., ethynyl groups of the type aryl-C≡C-H, or both types can be present in the polyacetylenic compound. Those compounds containing at least one external acetylenic group are preferred since these are the most reactive. Generally those compounds containing only internal acetylenic groups are used in admixture with a compound containing at least one ethynyl group. Exemplary of the polyacetylenically substituted aromatic compounds are m- and p-diethynylbenzenes; diethynyl toluenes; diethynyl xylenes; 9,10-diethynylanthracene; diethynylbiphenyl; 9,10-diethynylphenanthrene; 4,4'-diethynyl-trans-azobenzene; di(ethynylphenyl)ether; 2,3,5,6-tetrachloro-1,4-diethynylbenzene; diphenyl-diacetylene (i.e., diphenylbutadiyne); dibenzyl-diacetylene; di-p-tolyldiacetylene; di-α-naphthyldiacetylene; 1-chloro-2,5-diethynylbenzene; 2,2'-dichlorodiphenyldiacetylene; 4,4'-dichlorodiphenyldiacetylene; 4,4'-dibromodiphenyldiacetylene; 1,4-bis(phenylethynyl)benzene; 1,3-bis(phenylethynyl)benzene; 9,10-bis(phenylethynyl)anthracene; 1,3,5-triethynylbenzene; 1,2,4-triethynylbenzene; 1,3,5-tris-(phenylethynyl)-2,4,6-triphenylbenzene; 1,2,4-tris(phenylethynyl)-3,5,6-triphenylbenzene; tris(ethynylphenyl)benzene, etc. Monoacetylenically substituted aromatic compounds can also be utilized in the preparation of the prepolymer as, for example, phenylacetylene, biphenylacetylene, etc.

As mentioned earlier, mixtures of the polyacetylenically substituted aromatic compounds may be used to prepare the prepolymers. A particularly advantageous mixture is that of diethynylbenzene with diphenylbutadiyne, with the latter component constituting from about 30 to about 75% by weight of the total mixture. The diethynylbenzene component may be m-diethynylbenzene, p-diethynylbenzene or mixtures thereof. The resulting copolymers contain about 30 to about 75% by weight of diphenylbutadiyne-derived units since the diphenylbutadiyne component enters the copolymer at substantially the same rate as the diethynylbenzene component. These copolymers may be cured, with or without addition of a monomeric acetylenically substituted aromatic compound having a melting point below about 185° C. and a boiling point above about 250° C., to provide thermoset resins having the prescribed strength and high temperature oxidation resistance properties. In addition, the resins derived from these copolymers have significantly higher elongation at break values, about 1.1 to about 1.8%, in comparison to the corresponding resins derived from diethynylbenzene homopolymers, wherein the elongation at break values are less than 1.0%.

Another advantageous mixture is that of diethynylbenzene with phenylacetylene. Again, the diethynylbenzene component may be m-diethynylbenzene, p-diethynylbenzene or mixtures thereof. The phenylacetylene component in this case enters the copolymer at approximately one-half the rate of the diethynylbenzene component. Thus, considerable variation in the composition of the reaction mixture is possible in producing copolymers containing from about 10 to about 45% by weight of phenylacetylene-derived units. The resulting copolymers when combined with a monomeric acetylenically substituted aromatic compound having a melting point below about 185° C. and a boiling point above about 250° C., such as diphenylbutadiyne and diphenylacetylene, can be cured to provide thermoset resins having the prescribed high temperature oxidation resistance properties. Additionally, these resins are significantly higher in flexural strength and flexural modulus in comparison to the corresponding resins prepared from the diethynylbenzene homopolymers.

The prepolymerization reaction is carried out by heating the polyacetylenically substituted aromatic compound with an aromatization catalyst. The reaction can be carried out in bulk or in the presence of an inert diluent. Any inert diluent can be used, as, for example, ethers such as 1,2-dimethoxyethane, dioxane and tetrahydrofuran, or aromatic hydrocarbons such as benzene, toluene, xylene, etc. The amount of diluent used is not critical and generally will be such as to form a concentration of the diethynylbenzene in the diluent of from 2 to 50%. Obviously, larger amounts can be used.

Any aromatization catalyst can be used to effect this cyclization reaction. By the term aromatization catalyst is meant a catalyst that promotes the formation of an aromatic ring by the cyclization of three acetylene groups. Preferred aromatization catalysts are nickel catalysts such as nickel bis(acrylonitrile), nickel bis(acraldehyde), nickel carbonyl bis(triphenylphosphine), nickel cyanide bis(triphenylphosphine), nickel acetylacetonate in combination with triphenylphosphine, and the Group V-B metal halides such as niobium pentahalides and tantalum pentahalides. The amount of the catalyst used can be varied widely but generally will be from about 0.5 to about 5% of the monomer by weight.

The polymerization is carried out by heating the polyacetylenic monomer with the catalyst to a temperature of from about 55° C. to about 250° C. and more preferably from about 80° C. to about 150° C. Preferably the reaction is carried out in an inert atmosphere.

In carrying out the process it is essential to stop the reaction prior to complete conversion of the monomer. If the reaction is allowed to go to completion, the product is a highly cross-linked, insoluble, infusible material that cannot be plastic formed, nor can it be fluidized with another acetylenically substituted aromatic compound and then plastic formed. Hence the reaction is generally stopped at a monomer conversion above about 30% and below about 90%, and preferably at a monomer conversion of from about 50 to about 90%. By so doing, it is possible to produce a prepolymer having a number average molecular weight of from about 900 to about 12,000, avoid the production of the very high molecular weight polymer that is cross-linked and no longer useful for the production of plastic formed articles and at the same time retain in the prepolymer at least about 5%, and preferably about 5 to 20%, acetylene groups by weight of the prepolymer for reaction in the second stage of the thermoset resin preparation. The prepolymers are soluble in aromatic hydrocarbons and ethers.

The method by which the prepolymerization reaction is stopped and the prepolymer is isolated will, of course, depend in large measure on the method used in preparing the prepolymer, the monomer or monomers used in its preparation, etc. If a polyacetylenically substituted aromatic monomer of high volatility were used in the preparation of the polymer, i.e., one having a boiling point below about 250° C., then any of such a monomer remaining in the prepolymer should be removed to avoid foaming and void formation in the plastic forming and curing steps used in the preparation of the thermoset resin in the second stage reaction. This removal can be effected by vacuum evaporation or steam distillation of the prepolymerization reaction mixture or the reaction mixture can be mixed with a diluent which is a solvent for the monomer and a non-solvent for the prepolymer. In the latter case, the prepolymer can be separated, as for example, by filtration, and the monomer, any prepolymer remaining in solution, and the diluents can be recovered and recycled in the process. Suitable diluents for precipitating the prepolymer are methanol and aliphatic hydrocarbons or mixtures thereof such as petroleum ether, pentane, hexane, heptane, etc.

The prepolymers of this invention are unique polymers, which in contrast to the acetylene polymers of the prior art, can be used to prepare thermoset resins. It is well known that acetylene and substituted acetylenes, as for example, phenylacetylene, can be polymerized, but the polymers so produced are linear polymers, many of which have olefinic or acetylenic unsaturation in the polymer chain. It is also known that aliphatic compounds containing two or more acetylenic groups can be polymerized, but again the polymer is linear and contains acetylenic unsaturation in the polymer chain. However, the instant prepolymers, prepared from a polyacetylene compound with an aromatization catalyst, differ from the prior art acetylene polymers in that they are predominately non-linear in structure, at least 50% of the acetylenic unsaturation of the monomer having been converted during polymerization into aromatic structures. Furthermore, the unsaturation remaining in the prepolymer is chiefly acetylenic, which permits further polymerization in the second stage reaction, and the prepolymer has only a low degree of olefinic unsaturation. The acetylenic content of the prepolymer will preferably be from about 5 to about 20% by weight of the prepolymer. The low degree of olefinic unsaturation is important since the presence of a significant amount of such unsaturation leads to thermal and oxidative instability of the final thermoset resin at high temperature. The formation of aromatic structures during the polymerization contributes oxidation resistant and stable linkages.

The olefinic unsaturation of the prepolymer can be determined by a nuclear magnetic resonance method in which the number of hydrogen atoms attached to olefinic carbons, such hydrogens hereafter being referred to as olefinic protons, is compared with the number of hydrogen atoms attached to aromatic rings, such hydrogens hereafter being referred to as aromatic protons. The amount of acetylenic unsaturation can be determined by a similar technique comparing the ratio of hydrogens attached to acetylenic carbons, such hydrogens hereafter being referred to as acetylenic protons, with the aromatic protons. The prepolymer, to be useful in the preparation of the final thermoset resin, will, as stated above, have a ratio of aromatic protons to olefinic protons greater than about 2.4:1 and preferably greater than about 7.5:1.

The ratio of acetylenic, aromatic and olefinic protons present in the prepolymer is determined by a nuclear magnetic resonance method using deuterated acetone as a solvent. The areas under the peaks near 3.63 ppm., the peak at 7.48 ppm., and under the curve between 6.83 and 5.4 ppm. are proportional to the number of acetylenic, aromatic and olefinic protons, chemical shift values being measured versus an internal tetramethylsilane reference.

The amount of acetylenic protons, and so the acetylene group concentration, is determined quantitatively by use of an internal standard, nitromethane added in accurate proportion to the prepolymer and giving a signal peak at 4.42 ppm.

PREPARATION OF THE MOLDING COMPOSITION

The above-described prepolymers are high melting materials and, in so far as most thermoforming techniques are concerned, the prepolymers do not have the flow properties required for plastic forming at temperatures below the aromatization polymerization reaction temperature. In other words, if they are heated to flow temperature the polymerization reaction proceeds so that an infusible, insoluble and intractable product is formed. In accordance with one embodiment of this invention, it has been found that by adding an acetylenically substituted aromatic compound that has a melting point below about 185° C. and a boiling point above about 250° C. or vapor pressure at 125° C. of less than about 20 mm., it is possible to produce a composition that will have sufficient flow to permit plastic formation and more importantly, that, when further heated after plastic forming, will copolymerize with the acetylenic unsaturation in the prepolymer and produce a thermoset resin.

The acetylenically substituted aromatic compounds that can be used to modify the flow properties of the prepolymer and which are reactive (copolymerizable) with the prepolymer can be any mono- or polyacetylenically substituted aromatic compound, which can be the same or different from the compound used to prepare the prepolymer, provided that this acetylenically substituted aromatic compound has a melting point below about 185° C. and a boiling point above about 250° C. For purposes of discussion, these acetylenic compounds are referred to herein as fluidizing acetylenic compounds. Exemplary of these compounds are betanaphthylacetylene, biphenylacetylene, 4-ethynyl-trans-azobenzene, diphenylacetylene, di-m-tolylacetylene, di-o-tolylacetylene, bis(4-ethylphenyl)acetylene, bis(3,4-dimethylphenyl)acetylene, bis(4-chlorophenyl)acetylene, phenyl benzoyl acetylene, betanaphthylphenylacetylene, di(alpha-naphthyl)acetylene, 1,4-diethynylnaphthalene, 9,10-diethynylanthracene, 4,4'-diethynylbiphenyl, 9,10-diethynylphenanthrene, 4,4'-diethynyl-transazobenzene, 4,4'-diethynyldiphenyl ether, 2,3,5,6-tetrachloro-1,4-diethynylbenzene, diphenylbutadiyne, di-p-tolyl-diacetylene, dibenzyldiacetylene, 2,2'-dichlorodiphenyl diacetylene, 3,3'-dichlorodiphenyl diacetylene, di(alpha-naphthyl)diacetylene, diethynyldiphenyl butadiyne, etc.

Just how the acetylenically substituted aromatic compound acts on the prepolymers to produce a plastic formable composition is not known. It is believed that in part it acts as a plasticizer, making it possible to shape the infusible prepolymer, and in part that it undergoes a partial reaction with the prepolymer. In any event, such acetylenic fluidizers, unlike ordinary plasticizers, react with the prepolymer when the plastic formed composition is cured and hence become a part of the final thermoset resin.

The amount of the acetylenic fluidizer incorporated in the prepolymer can be varied over a wide range, but generally will be from about 2 to about 70% by weight of the prepolymer and preferably from about 5 to about 40%. The acetylenic fluidizer can be incorporated in the prepolymer in a variety of ways. One of the simplest methods is to mix the two in a diluent that is a solvent for the two and which is preferably low boiling for ease in removing the diluent after the mixing operation. Suitable diluents for this purpose are methylene chloride, dichloroethane, acetone, methyl ethyl ketone, benzene, toluene, etc. Such diluents can be removed, after adequate mixing has been achieved, by evaporation, distillation, etc. The mixing operation can be carried out at any convenient temperature, generally at room temperature. On the other hand, if the monomer or monomers used for the preparation of the prepolymer have boiling points above about 250° C., the unreacted portion does not need to be removed from the prepolymer and can act as all or part of the fluidizer in the molding composition.

There can also be incorporated in the molding composition fillers, pigments, antioxidants and other desired additives. When the preferred compositions containing an acetylenic plasticizer are prepared, the additives are readily incorporated at the time the prepolymer and the acetylenic plasticizer are mixed and while the mixing diluent is still present. Exemplary of the materials that can be incorporated are organic and inorganic fibrous materials such as graphite, glass, asbestos, metals, metal oxides, metal carbides, boron, boron carbide, silicon carbide fibers, and particulate reinforcements such as glass beads, metal oxides, metal carbonates, clay, diatomaceous earth, etc. The amount of the filler incorporated in the molding composition can be varied widely, but generally will be from about 5 to 70 percent by weight of the composition.

After removing the mixing diluent, the plastic composition so obtained can be divided by any desired means into suitable size pieces for the plastic shaping operation. Alternatively, the composition can be ground to a fine powder and converted into pellets convenient for utilization in subsequent shaping operations by compacting under pressure at room temperature or at a somewhat elevated temperature. These molding compositions are stable and can be stored at room temperature.

FORMATION OF THE THERMOSET RESIN

In the case of a prepolymer modified with an acetylenic fluidizer the composition will melt on heating and remain sufficiently fluid so that it can be shaped by conventional plastic forming such as extrusion, compression, transfer and injection molding, calendering, forging, etc. Thus, shapes such as sheets, pipes, rods and wire coatings can be made by extrusion. Sheets can in subsequent operations be further modified in form as by embossing or thermoforming. More complex shapes can be made by molding operations. The temperature employed in the plastic forming operation can be varied widely, the preferred temperature being dependent on the amount of the acetylenic fluidizer employed, the molecular weight of the prepolymer, the type and amount of any filler or reinforcing agent present, the fabrication method, the pressure employed, and the amount of cross-linking desired during the shaping operation. Temperatures as low as about 40° C. can be used, or as high as 200° C., but generally will be within the range of from about 90° C. to about 165° C. As the heating continues above about 90° C., and generally at a pressure of from about 15 to about 15,000 p.s.i., the molding composition resolidifies into the desired shape. In operations such as extrusion or injection molding in which it may be desirable to recycle scrap material, low temperatures are employed to avoid much change in the flow properties of the composition during the fabrication. In other operations such as transfer or compression molding, it may be desirable to fabricate the material at an elevated temperature so that cross-linking or curing of the material occurs during the shaping operation. This is one method of operation applicable to the compression molding of the prepolymers directly to thermoset resins. However, the prepolymers, preferably in finely-divided form, also may be preliminarily shaped by application of pressure alone, and then heated to effect curing.

After the shaping operation and heating above 90° C. for a sufficient time to solidify the material, continued application of pressure during subsequent curing is not necessary. The further polymerization or cross-linking reaction to form the insoluble, thermally stable resin does not involve formation of any gaseous or volatile materials and accordingly there is no foaming or void formation. The molded or shaped article can then be converted to a thermoset resin by additional heating.

The temperature at which the molding composition is heated to effect the further polymerization and cross-linking, which can be referred to as the curing operation, can be varied widely and will depend on such factors as the components of the molding composition, the size and shape of the fabricated article, etc. In general, the conditions for effecting the cure will range from several hours at a temperature of about 100° C. to a few minutes at a temperature of about 300° C. Alternatively, a fabricated article can be used in its only partially cured form, and curing can be effected during use at an elevated temperature.

The reaction that takes place during the curing of the molding composition containing an acetylenic fluidizer is a copolymerization reaction between the prepolymer and the acetylenic fluidizer, which reaction at the same time effects cross-linking of the prepolymer. Hence, the final thermoset resin can be defined as a copolymer of the prepolymer and the acetylenic fluidizer. In the case of a molding composition containing no acetylenic fluidizer, the reaction during curing is one of further polymerization of the prepolymer.

The thermoset resins so produced are hard, stiff, strong, abrasion resistant, infusible and insoluble. They retain strength, stiffness and insolubility at elevated temperatures, are stable to exposure at elevated temperatures for extended periods, and are resistant to oxidative attack at elevated temperature. Their oxidative stability can be further enhanced by incorporation of inorganic stabilizers such as ammonium biphosphate, calcium hypophosphite, etc. They are highly resistant to chemical attack by strong acids and concentrated alkali. As previously stated, these thermoset resins are characterized by having a flexural strength of at least about 4000 p.s.i. and a flexural modulus of at least about 350,000 p.s.i., retaining at least about 60% of said flexural modulus in an inert atmosphere up to a temperature of at least about 300° C., retaining at least about 50% of said flexural strength and modulus and at least about 80% of their weight when a 30 mil thick sheet is aged in air at 200° C. for 1000 hours and losing less than about 10% of their weight when heated, in powder form, to 500° C. at a rate of 5° per minute in an inert atmosphere. Obviously, these values can be greatly increased by the addition of fillers and other strengthening additives.

By the terms "flexural strength" and "flexural modulus" is meant the strength and modulus as measured according to the procedure described in ASTM #D-790-70 - Flexural Properties of Plastics.

The new thermoset resins of this invention are useful as thermosetting binder resins for glass, carbon, asbestos and boron fibers and in the preparation of moldings to be used in high temperature environments, as for example, turbine blades for jet engines, aeroplane wing edges, ablative coatings for space re-entry vehicles, etc.

The following examples will illustrate the preparation of the prepolymers, the molding compositions and the thermoset resins of this invention. All parts and percentages are by weight unless otherwise indicated.

EXAMPLE 1

Preparation of the Prepolymer

A polymerization vessel with a nitrogen atmosphere was charged with 71 parts of p-diethynylbenzene, 1.062 part of nickel acetylacetonate, 2.124 parts of triphenylphosphine and 737 parts of anhydrous dioxane. The clear pale-green solution was then heated, while stirring, to reflux temperature and held there until the desired conversion level of 57% was achieved. This was determined by withdrawing an aliquot periodically, cooling the aliquot to room temperature, pouring it into 5 volumes of petroleum ether, drying and weighing the precipitate. When the desired conversion was reached (1 hour, 50 minutes), the reaction mixture was poured into 5 volumes of petroleum ether. A dark, tarry mass precipitated. The supernatant was separated and filtered. The solids were allowed to air dry and then were washed with petroleum ether and dried. The product so obtained was a brown powder. It had a number average molecular weight of about 2900. Analysis by NMR as described above showed the prepolymer to have a ratio of aromatic protons to olefinic protons of greater than 30:1. The prepolymer contained 15.0% acetylene groups.

Preparation of Thermoset Resin

A molding composition was prepared by mixing 50 parts of a calcined diatomaceous earth containing 93-95% $SiO_2$, which had previously been dried by heating to 300° C. and cooling under anhydrous conditions, 8.5 parts of diphenylacetylene, and 41.5 parts of the above prepared prepolymer, adding enough acetone to dissolve the two organic materials and to obtain better mixing with the filler. The acetone was then evaporated in an air stream and then under vacuum. The molding composition so obtained was a fine cocoa-brown powder.

The mold used for molding this composition was a semi-positive 2¼ inch disk mold. Into the mold at room temperature was placed an aluminum disk, 5.3 g. of the molding composition, and a second aluminum disk. The male part of the mold was inserted and the mold was placed in a preheated hydraulic press, the temperature of the molding sample being monitored by means of a thermocouple. The temperature of the sample was increased to 275° C. during 50 minutes heating under a pressure of 1500 p.s.i. The heaters were turned off (final temperature of sample 280° C.), the pressure released and the mold was cooled. After a total time of 1 hour, 40 minutes, the mold was removed from the press and quenched in cold water. The molded disk so obtained was hard and shiny brown. It had a density of 1.54, and a Barcol hardness (No. 935-1) of 75. Flexural properties were determined to be: strength — 4,520 p.s.i.; modulus — 860,000 p.s.i.; and elongation 0.54%.

A second molding was made from the same molding composition but the sample was heated in 16 minutes to 165° C. under 2000 p.s.i. pressure. At this point the heaters were turned off, the pressure reduced to zero and cooling water turned on in the platens. In 8 minutes the mold was removed from the press and quenched in cold water. The molded disk had a density of 1.46 and a Barcol hardness of 59. Its flexural strength was 4500 p.s.i., modulus was 730,000 and elongation was 0.62%. It was partially soluble in benzene. This sample was cured further by heating in an air oven at atmospheric pressure at 200° C. for 3 hours. It then had a density of 1.58 and a hardness of 81. The flexural strength was 6500 p.s.i., modulus was 1,100,000 p.s.i. and elongation was 0.59%. It was completely insoluble in benzene.

Another molding composition was prepared using the above prepared prepolymer, but omitting the diphenylacetylene. The prepolymer was blended with 50% by weight based on the prepolymer of the calcined diatomaceous earth. Acetone was added to dissolve the prepolymer and to obtain better mixing with the filler. The acetone then was evaporated under vacuum. The molding composition so obtained was molded in a 1-inch diameter positive disk mold. The mold temperature was 150° C. and the mold pressure was 9000 p.s.i. The molded part then was post-cured for 2 hours at 250° C. and atmospheric pressure. The molded disk so obtained had a flexural strength of 7220 p.s.i. and a flexural modulus of 1,730,000 p.s.i.

EXAMPLE 2

Preparation of Prepolymer

A prepolymer was prepared from p-diethynylbenzene as described in Example 1 except that the amount of catalyst used was reduced by one-third and the polymerization was carried out for 4 hours to a conversion of 42%. The prepolymer had a number average molecular weight of 2000, contained 15.5% acetylene groups and had a ratio of aromatic protons to olefinic protons of greater than 30:1.

Preparation of Resin

A molding composition was prepared as described in Example 1. Disks were then molded from a mixture of 65 parts of this molding composition and 35 parts of the molding composition prepared in Example 1. In this case the sample disks were heated to 300° C. in 47 minutes at a maximum pressure of 2300 p.s.i., after which time the heaters were turned off, the pressure reduced and the mold cooled for 40 minutes. The disk so obtained was a hard brown disk. It had a density of 1.61, flexural strength of 4460 p.s.i., flexural modulus of 840,000, elongation of 0.55% and a Barcol hardness of 76. After aging for 4.5 hours at 320° C. in air, the flexural strength was 4750, the flexural modulus was 775,000 and the elongation was 0.62%.

EXAMPLE 3

This example demonstrates the effect of the acetylenic fluidizer on the prepolymer and the molding composition prepared therefrom.

A prepolymer was prepared from p-diethynylbenzene following the general procedure described in Example 1 except that the prepolymerization was carried to a monomer conversion of 30%. The prepolymer had a number average molecular weight of 1050, contained 16.5% acetylene groups and the aromatic proton to olefinic proton ratio was greater than 30:1. Molding compositions were prepared from this prepolymer as described in Example 1 but omitting the diatomaceous earth filler and using varying amounts of the diphenylacetylene (DPA). The viscosity of these molding compositions at various temperatures and the changes therein with time, the temperature being changed at a heating rate of 10° per minute, is tabulated below:

| % DPA | Temp. ° C. | Viscosity ($\times 10^5$ poise) |
| --- | --- | --- |
| 0 | 23 | Too high to measure |
|   | 100 | 1200 |
|   | 120 | 1000 |
|   | 130 | 900 |
|   | 150 | Too high to measure |
| 5 | 23 | Too high to measure |
|   | 90 | 1500 |
|   | 120 | 700 |
|   | 140 | Too high to measure |
| 10 | 23 | Too high to measure |
|   | 80 | 500 |
|   | 110 | 100 |
|   | 130 | Too high to measure |
| 20 | 23 | Too high to measure |
|   | 80 | 70 |
|   | 110 | 1.0 |
|   | 128 | Too high to measure |
| 30 | 23 | Too high to measure |
|   | 80 | 2.0 |
|   | 95 | 0.05 |
|   | 128 | Too high to measure |
| 40 | 23 | Too high to measure |
|   | 60 | 0.6 |
|   | 75 | 0.1 |
|   | 125 | Too high to measure |

These data demonstrate the fluidizing action of the acetylenic fluidizer and at the same time show that reaction between the prepolymer and acetylenic fluidizer occurs at temperatures above about 90° C. Each of these melts could be held for several hours at temperatures up to 80° C. At temperatures above 100° C., their viscosity increased and solidification occurred in a short time.

EXAMPLES 4 AND 5

A prepolymer was prepared from para-diethynylbenzene following the general procedure described in Example 1, using 150 parts of monomer, 1.8 parts of nickel acetylacetonate and 3.9 parts of triphenylphosphine in 1300 parts of benzene as diluent and reacting at reflux temperature to 78% conversion. The prepolymer had a number average molecular weight of 5000, contained 13.0% acetylene groups and the ratio of aromatic protons to olefinic protons was 10:1.

Molding compositions were prepared from this prepolymer using 30% of an acetylenic fluidizer and no filler. Disks were then molded from these compositions by heating for 6 minutes at 150° C. under 1000 p.s.i. and cured by heating for 5 hours at 250° C. at atmospheric pressure. The flexural properties determined on them are tabulated below.

| Acetylenic Fluidizer | Flexural Strength (p.s.i.) | Modulus (p.s.i.) |
|---|---|---|
| 4,4'-diethynyldiphenyl ether | 6008 | 1,148,333 |
| diphenylbutadiyne | 7146 | 1,390,670 |

EXAMPLE 6

A mixture of 90 parts of meta-diethynylbenzene and 10 parts of para-diethynylbenzene was dissolved in 840 parts of anhydrous benzene containing 11 parts of chlorobenzene. The solution was sparged with nitrogen and heated to reflux temperature. A suspension of 1.5 parts of nickel acetylacetonate in 13 parts of benzene was added and then a solution of 3.0 parts triphenylphosphine in 25 parts of benzene. The solution was held at reflux temperature for 4.75 hours which was a conversion of 70%. The solution was then poured into 8000 parts of petroleum ether and the yellow powder, separated by filtration, amounted to 30 parts. The prepolymer had a number average molecular weight of 4500, contained 13.9% % acetylene groups and had a ratio of aromatic protons to olefinic protons of 10:1.

Molding compositions were prepared from this prepolymer by adding 5, 10, 20 and 30% by weight of diphenylacetylene. Disks were molded from each by heating at 150° C. for 6 minutes under 1000 p.s.i. pressure and then were cured by heating for 2 hours at 250° C. at atmospheric pressure and the flexural properties were determined. The prepolymer itself, with no added diphenylacetylene, also was molded, using 9000 p.s.i. pressure.

| Diphenylacetylene | Flexural Strength (p.s.i.) | Modulus (p.s.i.) |
|---|---|---|
| 0% | 9500 | 1,140,000 |
| 5% | 6700 | 1,100,000 |
| 10% | 5700 | 1,200,000 |
| 20% | 5100 | 850,000 |
| 30% | 4500 | 600,000 |

EXAMPLE 7

A polymerization vessel with a nitrogen atmosphere was charged with 3.0 parts of 4,4'-diethynylbiphenyl, 0.15 part of bis(triphenylphosphine) nickel dicarbonyl and 100 parts of anhydrous dioxane. The solution was heated under nitrogen on a steam bath and refluxed for 1 hour. About 65% of the monomer had been converted in this time to a prepolymer having a number average molecular weight of 3000. The solution was then evaporated to dryness and dried under a high vacuum.

A film was prepared from the yellow solid so obtained, which was a mixture of 65% prepolymer and about 35% of unreacted monomer, by heating this solid on a steel plate at 160° C. This film was then cured under nitrogen at atmospheric pressure at 255°-258° C. for 4 hours. This film had a weight loss of only 8% on heating in air to 500° C. at a rate of 5° per minute.

EXAMPLE 8

Example 7 was repeated except that di(4-ethynylphenyl) ether was substituted for the 4,4'-diethynylbiphenyl used in that example and the prepolymerization reaction time was 2 hours. After removal of the dioxane solvent, there was obtained a very viscous, gummy, yellow solid, which was a mixture of 60% prepolymer, with a number average molecular weight of about 2500, and 40% unreacted monomer. The material was formed into a film at 150° C. and cured at 250° C. for 4 hours. The cured film had a weight loss in air of 9% when heated to 500° C. at a rate of 5° per minute.

EXAMPLES 9 AND 10

A prepolymer was prepared, following the general procedure described in Example 1, using as the monomer a mixture of 90% meta- and 10% para-diethynylbenzene, 0.26% nickel catalyst and polymerizing to a conversion of 80%. The prepolymer had a number average molecular weight of 5500, contained 12.8% acetylene groups and had an aromatic proton to olefinic proton ratio of 13:1.

Three molding compositions were prepared from this prepolymer by blending it with 10% by weight of 1,4-diphenylbutadiyne and additionally adding 10 parts per hundred parts of the blend, of a stabilizer to two of them.

Disks 30 to 35 mils thick and one inch in diameter were prepared and cured by heating for 5 hours at 250° C. These disks were then heated in a forced air oven at 260° C. The time, in hours, at this temperature to give a 10% weight loss of the resin is tabulated below.

| Stabilizer Added | Time to 10% wt. loss at 260° C. |
|---|---|
| None | 221 |
| Ammonium biphosphate | 500 |
| Calcium hypophosphite | 566 |

EXAMPLE 11

Into an argon flushed reaction vessel was placed 20 parts of 1-chloro-2,5-diethynylbenzene and 70 parts of benzene. The vessel contents were stirred and heated to reflux. A solution of 0.05 part of nickel acetylacetonate in 4.5 parts of benzene at 40° C. was added followed by a solution of 0.15 part of triphenylphosphine in 4.5 parts of benzene. The solution was allowed to reflux for 1.5 hours, at which point about 80% of the monomer had been converted to prepolymer. The solution was cooled and poured into 5 volumes of methanol. The brown solid that precipitated was filtered, washed and vacuum dried. The yield of polymer was 9.0 parts. The prepolymer had a number average molecular weight of 7000, contained 11% acetylene groups and the aromatic to olefinic proton ratio was 6:1. This prepolymer material was mixed with 0.9 part diphenylbutadiyne and molded at 150° C. and cured at atmospheric pressure at 250° C. for 2 hours. The resulting resin had a flexural strength of 5000 p.s.i. and a flexural modulus of 600,000 p.s.i.

EXAMPLE 12

A prepolymer was prepared as described in Example 1, the prepolymerization reaction being carried to a monomer conversion of 90%. This prepolymer had a number average molecular weight of 9700, contained 9.5% acetylene groups and had an aromatic to olefinic proton ratio of 8:1. It was blended with 10%, by weight, of diphenylacetylene in benzene and the benzene was then removed by evaporation. The blend was molded in a picture frame mold at 140° to 150° C. for 6 minutes under 6000 p.s.i. pressure and then cured at atmospheric pressure by heating for 2 hours at 250° C. The resin had a flexural strength of 6700 p.s.i. and a flexural modulus of 890,000 p.s.i. Repeated flexural modulus measurements were carried out on this molding at increasing temperature. The following data were obtained:

| Temp., ° C. | Flexural Modulus (p.s.i.) |
| --- | --- |
| 42 | 860,000 |
| 103 | 870,000 |
| 145 | 750,000 |
| 183 | 780,000 |
| 231 | 720,000 |
| 300 | 700,000 |
| 326 | 660,000 |

EXAMPLE 13

Preparation of Prepolymer

A polymerization vessel with an argon atmosphere was charged with 45 parts of meta-diethynylbenzene, 5 parts of paradiethynylbenzene, 360 parts of benzene and 2.2 parts of monochlorobenzene. This solution was then heated, while stirring, to reflux temperature and held there. A solution of 1 part of triphenylphosphine in 18 parts of benzene was added under a blanket of argon and then a suspension of 0.5 part of nickel acetylacetonate in 9 parts of benzene was added. After 6.33 hours of refluxing, 88.5% of the mixture of diethynylbenzenes had polymerized, as determined by gas-liquid chromatographic analysis of the mixture. The solution was cooled and poured into 7 volumes of petroleum ether. A yellow powder precipitated which was filtered, washed with fresh petroleum ether and vacuum dried to yield 32 parts of yellow powdery polymer. It had a number average molecular weight of about 8500. As determined by NMR, it had an acetylene content of 13.4% and a ratio of aromatic protons to olefinic protons of 15.1:1.

Preparation of Thermoset Resin

A molding composition was prepared by mixing 50 parts of calcined diatomaceous earth containing 93–95% $SiO_2$, 5 parts of 1,4-diphenylbutadiyne, and 45 parts of the above prepolymer, adding enough benzene to dissolve the two organic materials and to obtain better mixing with the filler. The benzene was then removed under vacuum. The molding composition so obtained was a fine yellowish-brown powder.

The powder was charged to a fully positive circular mold preheated to 150° C. in a hydraulic press. Then 9000 p.s.i. pressure was applied. After 6 minutes, the mold was removed from the press. Then, while still hot, the hard, dark brown molded disk was removed, and post-cured at 150° C. for 24 hours and at 250° C. for 5 hours under atmospheric pressure. The flexural properties were determined to be: strength, 8600 p.s.i.; modulus, 1,450,000 p.s.i.

EXAMPLE 14

A copolymer prepolymer of diethynylbenzene and phenylacetylene was prepared in refluxing benzene solvent. The polymerization vessel was charged with 60 parts of a 90:10 mixture of m- and p-diethynylbenzenes, 60 parts of phenylacetylene, 600 parts of benzene and 2 parts of chlorobenzene. After heating to reflux, 5 parts of a catalyst solution prepared by adding 0.3 part of nickel acetylacetonate and 0.6 part of triphenylphosphine in 15 parts benzene were added. After 2 hours, an additional 10 parts of this catalyst solution was added. After 5 hours, gas-liquid chromatographic analysis showed that 74% of the diethynylbenzenes and 35% of the phenylacetylene had been converted to copolymer. The copolymer was precipitated by adding the solution to five times its volume of petroleum ether, 26 parts being recovered. This product had a number average molecular weight of about 3,000, an acetylene content of 8.9%, and an aromatic to olefin proton ratio of 5.5:1.

A molding composition was prepared from this prepolymer by adding 10% by weight of diphenylbutadiyne and disks were molded using a mold temperature of 150° C. for 6 minutes with 2000 p.s.i. pressure, followed by curing 2 hours at 250° C. at atmospheric pressure. The flexural properties were found to be: strength — 8230 p.s.i.; modulus — 1,110,000 p.s.i.

EXAMPLE 15

A copolymer prepolymer of diphenylbutadiyne and p-diethynylbenzene was prepared in refluxing benzene solvent. The polymerization vessel was charged with 63 parts of diphenylbutadiyne, 2 parts of diethynylbenzene, 600 parts of benzene, and 2 parts of chlorobenzene. After heating to reflux, 2 parts of a catalyst mixture prepared by mixing 2 parts of nickel acetylacetonate and 4 parts of triphenylphosphine in 20 parts of benzene were added. After 1 hour, an additional 10 parts of diethynylbenzene was added. After 2 hours, 10 parts of diethynylbenzene and 2 parts of catalyst solution were added. After 3 hours, 20 parts of diethynylbenzene and 4 parts of catalyst solution were added. After a total reaction period of 7 hours, gas-liquid chromatographic analysis of the reaction mixture showed that 10% of each of the monomeric components remained. The solution was added to 5 times its volume of methanol, and 77 parts of the copolymer was precipitated. It had an acetylene content of 8.4% and an aromatic to olefin hydrogen ratio of 8:1.

A molding composition was prepared from this prepolymer by adding 5% by weight of diphenylbutadiyne and 10% by weight of calcium hypophosphite. Disks were molded using a mold temperature of 150° C. for 6 minutes at 2000 p.s.i., followed by curing outside the mold 2 hours at 250° C. at atmospheric pressure. The flexural properties of these cured disks were found to be: strength — 5000; modulus — 650,000 p.s.i.

EXAMPLE 16

A prepolymer was prepared, following the procedure of Example 1, using p-diethynylbenzene as the monomer and carrying the reaction to 62% monomer conversion. The prepolymer had a number average molecular weight of 2600, an acetylene content of 15.0% and an aromatic to olefin hydrogen ratio of 38:1. This prepolymer was blended with 20% by weight of diphenylacetylene, and disks 30 mils thick and one inch in diameter were prepared by compression molding at 150° C. for 6 minutes under 2000 p.s.i. pressure, followed by curing at atmospheric pressure for 2 hours at 250° C. The flexural strength of a sample as cured was 6040 p.s.i. and the flexural modulus was 950,000 p.s.i. Another sample disk was aged in an air oven at 230° C. for 1000 hours. At the end of this period it was found to have lost 10.5% of its weight and on testing at room temperature it had a flexural strength of 3390 p.s.i. and a flexural modulus of 614,000 p.s.i.

One of the disks was ground to a fine powder (passing 100 mesh screen) and was tested for weight loss by thermogravometric analysis by heating in a nitrogen atmosphere to 500° C. at a rate of 5° per minute. The weight loss at 500° C. was 6%.

EXAMPLE 17

A prepolymer was prepared following the procedure of Example 6. Molding compositions were prepared from this prepolymer by adding 5, 10, 20 and 30% by weight of diphenylbutadiyne (DPBD). The viscosity of these compositions and of the prepolymer itself at various temperatures as determined at a heating rate of 10° C. per minute is tabulated below:

| % DPBD | Temp. ° C. | Viscosity ($\times 10^5$ poise) |
|---|---|---|
| 0 | 100 | 50 |
|   | 140 | 6 |
|   | 160 | 100 |
| 5 | 80 | 20 |
|   | 100 | 8 |
|   | 120 | 3.5 |
|   | 160 | Too high to measure |
| 10 | 60 | 40 |
|   | 80 | 9 |
|   | 120 | 1 |
|   | 160 | 25 |
| 20 | 60 | 10 |
|   | 80 | 3 |
|   | 120 | 0.3 |
|   | 140 | 0.2 |
|   | 160 | 4 |
| 30 | 60 | 4 |
|   | 80 | 1.5 |
|   | 100 | 0.05 |
|   | 140 | 0.01 |
|   | 160 | 0.02 |

EXAMPLE 18

A prepolymer was prepared following the procedure of Example 6, except that the monomer mixture was 60% meta-diethynylbenzene and 40% para-diethynylbenzene. This prepolymer was molded in a one-inch diameter positive disk mold at a mold pressure of 9000 p.s.i. and a mold temperature of 150° C. The molded disk was post-cured at 250° C. and atmospheric pressure for 5 hours. The cured disk had a flexural strength of 7525 p.s.i. and a flexural modulus of 1,011,590 p.s.i.

EXAMPLE 19

Twenty-two and one-half parts of a prepolymer prepared according to the procedure of Example 6 and two and one-half parts 1,4-diphenylbutadiyne were dissolved in benzene. Ten parts of short chrysotile asbestos fiber was added and dispersed with magnetic stirring. The benzene was then removed on a rotary flash evaporator under reduced pressure. Twenty-one grams of the resulting composite was charged to a four-inch diameter, fully positive, disk mold and compression-molded for six minutes at 160°–180° C. under a pressure of 2400 p.s.i., and cured by heating for 16 hours at 200° C. under atmospheric pressure. Strips three-eighths of an inch in width were cut from the disk and found to have a flexural strength of 8690 p.s.i. and a flexural modulus of 1,800,000 p.s.i.

EXAMPLE 20

Eleven tows, eight inches in length, of surface-treated graphite fiber (Courtaulds) were coated with a benzene solution of 2.09 g. of a prepolymer prepared according to the procedure of Example 6 and 0.11 g. of 1,4-diphenylbutadiyne. After benzene evaporation, the tows were collimated in a fully positive, open-ended bar mold (bar size ¼ inch × 6 inches), compression-molded for six minutes at 143°–166° C. under a pressure of 5300 p.s.i. and then cured for 18 hours at 200° C. under atmospheric pressure. The resulting bar contained 51% by volume of graphite fiber as determined by resin burn-off at 390° C. for 72 hours. Prior to resin burn-off, the composite was found to have an average flexural strength of 90,950 p.s.i. and a flexural modulus of 13,900,000 p.s.i.

EXAMPLE 21

Eight plies of 2¼ inches × 3¾ inches treated glass cloth were coated with a benzene solution of 9.0 g. of a prepolymer prepared according to the procedure of Example 6 and 1.0 g. of 1,4-diphenylbutadiyne, and the benzene was evaporated. The plies were then stacked, placed in a 1/16 inch thick, semipositive, picture frame mold, compression-molded for five minutes at 170° C. and a pressure of 750 p.s.i., and then cured by heating for 18 hours at 230° C. under atmospheric pressure. The resulting laminate contained 51.7% by volume of glass as determined by resin burn-off as in Example 20. Strips were cut from the laminate and were found to have a flexural strength of 26,600 p.s.i. and a flexural modulus of 3,710,000 p.s.i.

EXAMPLE 22

Following generally the procedure of Example 13, a polymerization vessel with an argon atmosphere was charged with 60 parts of phenylacetylene, 54 parts of meta-diethynylbenzene, 6 parts of para-diethynylbenzene, 422 parts of benzene and 0.3 part of monochlorobenzene. The solution was brought to reflux, then 0.8 part of triphenylphosphine and 0.4 part of nickel acetylacetonate in benzene were added to the refluxing solution. The reaction was monitored by gas-liquid chromatographic analysis. Three hours after addition of the catalyst, 88.3% of the diethynylbenzene and 49.5% of the phenylacetylene had been utilized, and the reaction mixture was worked up as in Example 13 to obtain 53 parts (46% yield) of light yellow copolymer. Calculation based on monomer usage showed the copolymer to contain 64 mol percent of diethynylbenzene and 36 mol percent of phenylacetylene.

A molding composition was prepared from the above prepolymer using 20% of diphenylbutadiyne as acetylenic fluidizer. The composition was molded and cured following generally the procedure of Example 5. The resulting product had an average flexural strength of 17,425 p.s.i. and an average flexural modulus of 1,920,000 p.s.i.

EXAMPLE 23

Following the procedure of Example 22, a copolymer was prepared from a reaction mixture containing 75 parts of diphenylbutadiyne, 22.5 parts of meta-diethynylbenzene, 2.5 parts of paradiethynylbenzene, 413 parts of dioxane, 0.3 part of monochlorobenzene, 0.7 part of triphenylphosphine and 0.3 part of nickel acetylacetonate. Diethynylbenzene usage was 100% and diphenylbutadiyne usage was 83.7%. The light yellow copolymer product was obtained in 47% yield and contained 27.8 mol percent diethynylbenzene and 72.2 mol percent diphenylbutadiyne. Following the procedure of Example 22, a molding composition was prepared, molded and cured. The cured product had an average flexural strength of 7575 p.s.i. and an average flexural modulus of 460,000 p.s.i.

EXAMPLE 24

The procedure of Example 23 was essentially duplicated except to use 32.2 parts of diphenylbutadiyne, 61 parts of meta-diethynylbenzene and 6.8 parts of para-diethynylbenzene as the monomer mixture. The catalyst components were also reduced to 0.35 part of triphenylphosphine and 0.15 part of nickel acetylacetonate, and the reaction time was one hour from catalyst addition. The copolymer product contained 68.9 mol percent diethynylbenzene and 31.1 mol percent diphenylbutadiyne. Following the procedure of Example 22, a molding composition was prepared from the copolymer, and the composition was molded and cured. The cured product had an average flexural strength of 7295 p.s.i. and an average flexural modulus of 543,000 p.s.i.

What I claim and desire to protect by Letters Patent is:

1. A polyacetylenically unsaturated prepolymer consisting essentially of a polycyclotrimerization polymer of at least one polyacetylenically substituted aromatic compound selected from the group consisting of diethynylbenzene; diethynyltoluene; diethynylxylene; diethynylbiphenyl; 9,10-diethynylanthracene; 9,10-diethynylphenanthrene; di(ethynylphenyl)ether; 1-chloro-2,5-diethynylbenzene; 2,3,5,6-tetrachloro-1,4-diethynylbenzene; 4,4'-diethynyl-trans-azobenzene; diphenylbutadiyne; 2,2'-dichlorodiphenyldiacetylene; 4,4'-dichlorodiphenyldiacetylene; 4,4'-dibromodiphenyldiacetylene; di-p-tolyldiacetylene; di-α-naphthyldiacetylene; dibenzyldiacetylene; 1,4-bis(phenylethynyl)benzene; 1,3-bis(phenylethynyl)benzene; 9,10-bis(phenylethynyl)anthracene; 1,3,5-triethynylbenzene; 1,2,4-triethynylbenzene; 1,3,5-tris(phenylethynyl)-2,4,6-triphenylbenzene; 1,2,4-tris(phenylethynyl)-3,5,6-triphenylbenzene; tris(ethynylphenyl)benzene and mixtures of at least one of said compounds with phenylacetylene, said prepolymer having a number average molecular weight of from about 900 to about 12,000, a ratio of aromatic protons to olefinic protons from about 2.4:1 to about 38:1 and containing from about 5 to about 20% terminal acetylenic groups by weight of the prepolymer.

2. The prepolymer of claim 1 wherein the polymer of the polyacetylenically substituted aromatic compound is a polymer of a diethynylbenzene.

3. The prepolymer of claim 2 wherein the polymer of a diethynylbenzene is a copolymer of a diethynylbenzene and diphenylbutadiyne.

4. The prepolymer of claim 2 wherein the polymer of a diethynylbenzene is a copolymer of a diethynylbenzene and phenylacetylene.

5. A method of producing polyphenyl polymers comprising polycyclotrimerization of compounds selected from the group: (1) diethynyl derivatives of aromatic compounds having the formula

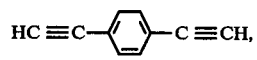

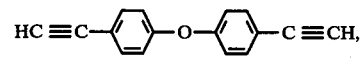

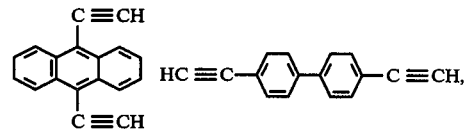

(2) mixtures of said diethynyl derivatives with the monoethynyl compound having the formula

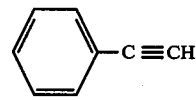

and (3) mixtures of p-diethynylbenzene with m-diethynylbenzene, in the presence of catalysts which are complex compounds of nickel.

6. The polyphenyl polymers produced by the method of claim 5.

7. A method according to claim 5, wherein the process of polycyclotrimerization is carried out in the presence of said catalyst taken in an amount of 1 mole per 25–1250 moles of the starting ethynyl compounds.

8. A method according to claim 5, wherein the process of polycyclotrimerization is carried out in an aromatic compound as solvent.

9. A method according to claim 8, wherein benzene, toluene or dioxane is used as an aromatic compound.

10. A method according to claim 5, wherein the process is carried out at a temperature ranging from 55° to 250° C.

* * * * *